UNITED STATES PATENT OFFICE.

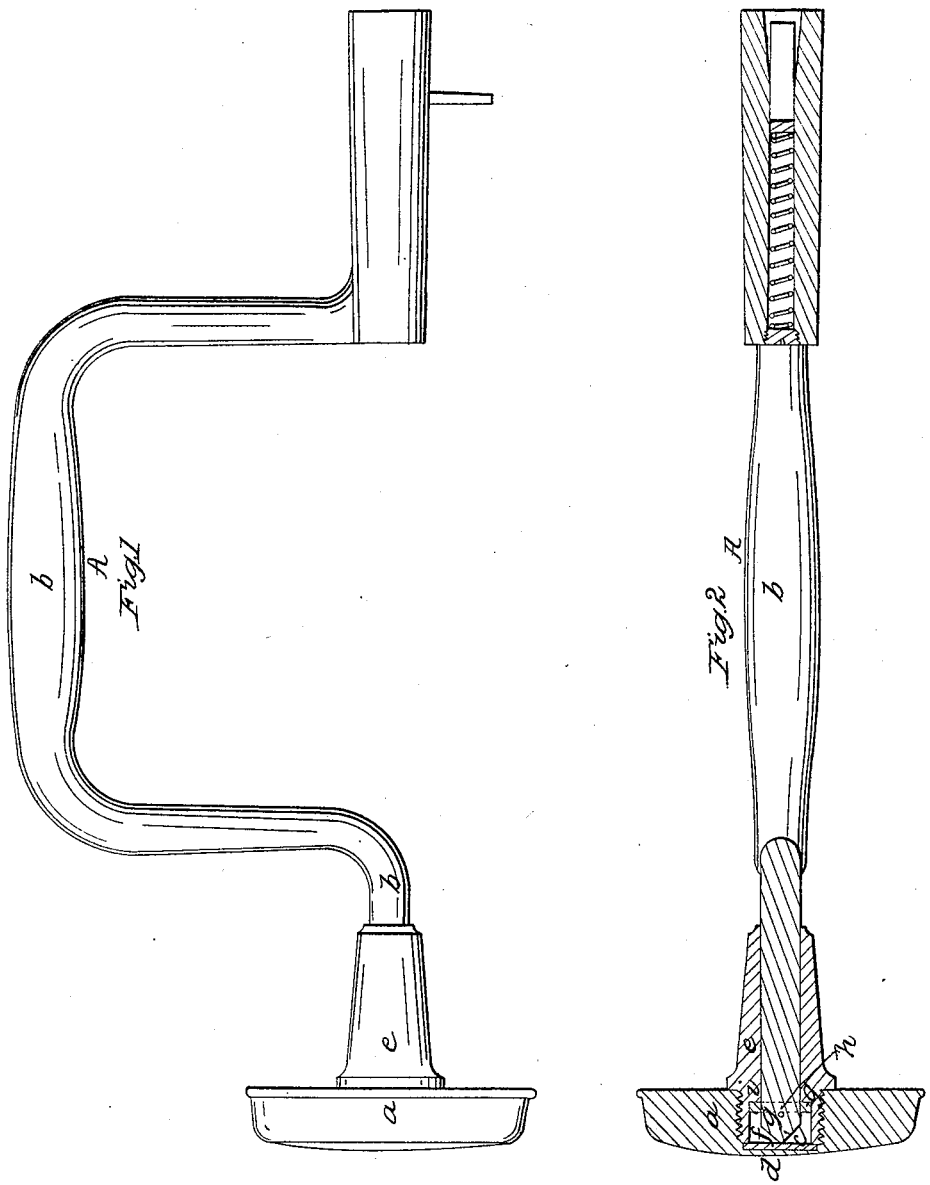

SAMUEL U. KING, OF WINDSOR, VERMONT.

IMPROVED BIT-STOCK.

Specification forming part of Letters Patent No. 39,151, dated July 7, 1863.

*To all whom it may concern:*

Be it known that I, SAMUEL U. KING, a resident of Windsor, in the county of Windsor and State of Vermont, have invented a new and useful Improvement in the Bit-Stock; and I do hereby declare the same to be fully described in the following specification and represented in the accompanying drawings, of which—

Figure 1 is a side view, and Fig. 2 a longitudinal section, of a bit-stock provided with my invention.

The said invention or improvement consists in making the stock not only with a pivot on its head and a step or bearing therefor in the handle, or with the bearing or step in the head and the pivot projecting from the handle, but with the handle applied to the stock by means of an adjustable sleeve screwed to the handle and held in place by means, and provided with an oil-chamber, substantially as hereinafter described.

In the drawings, A is the bit-stock, of which $a$ is the handle, and $b$ the cranked shank. At the upper end of the latter there is a conical pivot, $c$, which works against a metallic bearing or step, $d$, inserted and fixed in the handle $a$. This handle, which is made of lignum-vitæ, is secured to the upper part of a tube or sleeve, $e$, which encompasses the shank and is furnished with a chamber, $f$, for the reception of a metallic washer, $g$, which is placed on the shank, and is secured in place by a pin, $h$, which goes through the shank. The washer and the bottom part, $i$, of the chamber $f$ co-operate in preventing the sleeve from being drawn off the shank. The sleeve, however, slides freely in a longitudinal direction on the shank, and thus by so doing enables the bearing and pivot to remain in contact as they may become worn. The chamber $f$ serves also as an oil chamber or receptacle for containing or receiving a fluid for lubricating both the pivot and bearing, as well as the sleeve and shank, where they may be in contact.

By making and applying the bit-stock and handle in manner as described the usual friction and wear of the handle on a shoulder of the shank are avoided, and the shank can be revolved with little interference from friction. Besides this, the bearing parts can readily accommodate themselves to one another as they may become worn.

I claim—

The improved bit-stock as having the shank and handle pivoted together, as described, combined with a chambered sleeve, made and applied to both in manner and so as to operate therewith substantially as specified.

SAMUEL U. KING.

Witnesses:
MARY C. BUTLER,
CARLOS COOLIDGE.